(12) United States Patent
Price et al.

(10) Patent No.: US 10,916,024 B2
(45) Date of Patent: Feb. 9, 2021

(54) ACTIVE ILLUMINATION MANAGEMENT THROUGH CONTEXTUAL INFORMATION

(71) Applicant: Microsoft Technology Licensing, LLC, Redmond, WA (US)

(72) Inventors: Raymond Kirk Price, Redmond, WA (US); Michael Bleyer, Seattle, WA (US); Denis Demandolx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/399,443

(22) Filed: Apr. 30, 2019

(65) Prior Publication Data
US 2019/0257945 A1    Aug. 22, 2019

Related U.S. Application Data

(63) Continuation of application No. 15/424,713, filed on Feb. 3, 2017, now Pat. No. 10,302,764.

(51) Int. Cl.
*G06T 7/521* (2017.01)
*G02B 27/01* (2006.01)
(Continued)

(52) U.S. Cl.
CPC .............. *G06T 7/521* (2017.01); *G01S 7/484* (2013.01); *G01S 7/4814* (2013.01);
(Continued)

(58) Field of Classification Search
CPC ...... G01S 7/4911; G01S 7/4918; G01S 17/89; G01S 7/484; G02B 27/01; G02B 27/0172; G02B 2027/0118
(Continued)

(56) References Cited

U.S. PATENT DOCUMENTS

| | | | | |
|---|---|---|---|---|
| 2009/0091652 A1* | 4/2009 | Wernersson | ......... | H04N 5/2354 348/371 |
| 2010/0304854 A1* | 12/2010 | McEldowney | ......... | G06T 5/007 463/30 |
| 2011/0211056 A1* | 9/2011 | Publicover | ........... | H04N 5/2354 348/78 |
| 2012/0176476 A1* | 7/2012 | Schmidt | ................ | G01S 17/894 348/46 |

(Continued)

OTHER PUBLICATIONS

"Extended European Search Report Issued in European Patent Application No. 20161908.7", dated Jun. 25, 2020, 8 Pages.

*Primary Examiner* — Marnie A Matt
(74) *Attorney, Agent, or Firm* — Arent Fox LLP

(57) ABSTRACT

An illumination module and a depth camera on a near-eye-display (NED) device used for depth tracking may be subject to strict power consumption budgets. To reduce power consumption of depth tracking, the illumination power of the illumination module is controllably varied. Such variation entails using a previous frame, or previously recorded data, to inform the illumination power used to generate a current frame. Once the NED determines the next minimum illumination power, the illumination module activates at that power level. The illumination module emits electromagnetic (EM) radiation (e.g. IR light), the EM radiation reflects off surfaces in the scene, and the reflected light is captured by the depth camera. The method repeats for subsequent frames, using contextual information from each of the previous frames to dynamically control the illumination power. Thus, the method reduces the overall power consumption of the depth camera assembly of the NED to a minimum level.

20 Claims, 7 Drawing Sheets

(51) Int. Cl.
*H04N 5/235* (2006.01)
*G01S 17/89* (2020.01)
*G01S 7/484* (2006.01)
*G01S 7/481* (2006.01)
*G01S 17/08* (2006.01)
*G01S 7/4911* (2020.01)
*G01S 7/4912* (2020.01)
*G01S 17/86* (2020.01)

(52) U.S. Cl.
CPC ........... *G01S 7/4911* (2013.01); *G01S 7/4918* (2013.01); *G01S 17/08* (2013.01); *G01S 17/86* (2020.01); *G01S 17/89* (2013.01); *G02B 27/01* (2013.01); *G02B 27/0172* (2013.01); *G02B 27/0179* (2013.01); *H04N 5/2351* (2013.01); *H04N 5/2354* (2013.01); *G02B 2027/0118* (2013.01); *G02B 2027/0138* (2013.01); *G02B 2027/0178* (2013.01); *G02B 2027/0187* (2013.01)

(58) Field of Classification Search
USPC ......................................................... 348/135
See application file for complete search history.

(56) References Cited

U.S. PATENT DOCUMENTS

| | | | |
|---|---|---|---|
| 2012/0182539 A1* | 7/2012 | Grokop ................ | G01B 11/026 356/4.01 |
| 2013/0335302 A1* | 12/2013 | Crane ................ | G02B 27/0172 345/8 |
| 2014/0306874 A1* | 10/2014 | Finocchio ............... | G06F 3/017 345/156 |
| 2015/0181099 A1* | 6/2015 | Van Der Tempel .... | G01S 17/89 348/135 |
| 2016/0209648 A1* | 7/2016 | Haddick ............. | G06F 3/03547 |
| 2017/0025091 A1* | 1/2017 | Haddick ............ | G02B 27/0179 |

* cited by examiner

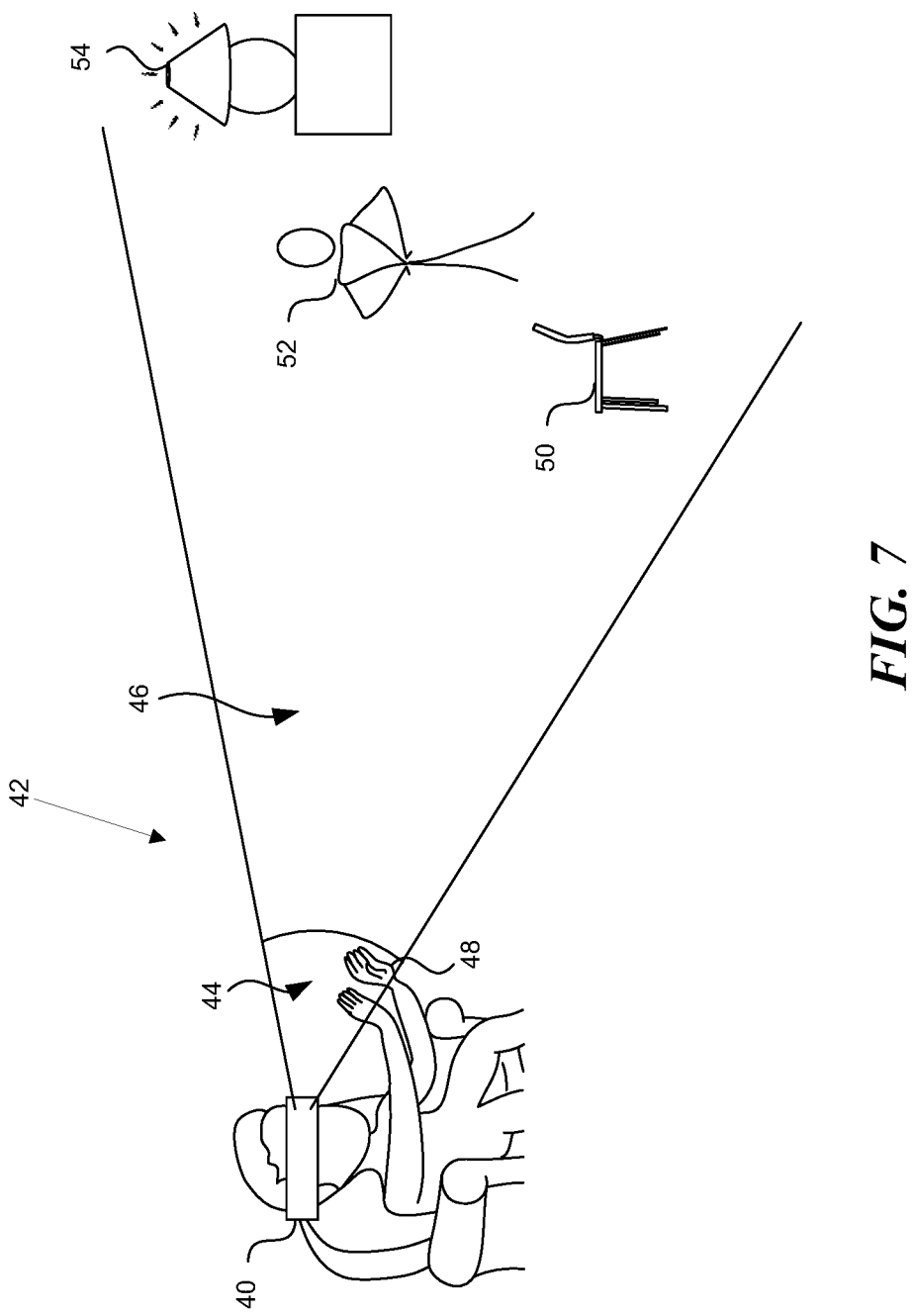

ACTIVE ILLUMINATION MANAGEMENT THROUGH CONTEXTUAL INFORMATION

CROSS-REFERENCE TO RELATED APPLICATION

This application is a continuation of U.S. Non-Provisional application Ser. No. 15/424,713, entitled "Active Illumination Management Through Contextual Information" and filed on Feb. 3, 2017, which is expressly incorporated by reference herein in its entirety.

TECHNICAL FIELD

This disclosure relates to machine vision. More particularly, this disclosure relates to power consumption of depth tracking in machine vision.

BACKGROUND

Depth sensing technology can be used to determine a person's location in relation to nearby objects or to generate an image of a person's immediate environment in three dimensions (3D). An example of depth sensing technology is a time-of-flight (ToF) depth camera. A ToF camera has a light source to emit light onto nearby objects. Light reflected off surfaces of the objects can be captured by the ToF camera. The time it takes for the light to travel from the light source of the ToF camera and reflect back from an object is converted into a depth measurement (i.e., distance to the object), which can be processed to map physical surfaces in the user's environment and, if desired, to render a 3D image of the user's environment. Another example of depth sensing technology is based on phase delay calculations. Emitting light at one or more known frequencies and comparing the phase of received reflected light with that of the emitted light enables a calculated phase delay. Knowing one or more phase delays of the reflected light enables a processor to determine the distance to the object from which the light was reflected.

Illumination systems draw power to operate. In mobile devices, there are often strict constraints on power consumption, as well as size, weight and cost. The greater the illumination power of a light source is, the greater is the power draw. This issue is present in a number of devices such as depth sensing, active infrared (IR) modules, night vision cameras, security cameras, and other applications of machine vision. The active illumination power of these systems is typically chosen to meet the worst expected operating scenario for the system. Setting the illumination power for the worst case results in over-illumination in many cases, thereby wasting power. Further, a device designed to provide active illumination for the worst case tends to require a power source (e.g., one or more batteries) with more capacity, and therefore more size and weight, than would otherwise be required, thereby undesirably adding to the size, weight and cost of the end product.

SUMMARY

Introduced here are at least one apparatus and at least one method. The at least one apparatus includes an electromagnetic radiation (EM) emitter that has a controllably variable illumination power, and the at least one method is a method of varying the illumination power. The EM emitter introduced here is suitable for applications such as Near Eye Display (NED) systems, and can be varied based upon contextual information such as ambient light level, reflectivity, and depth of scene, to avoid unnecessary over-illumination and, therefore, unnecessary power consumption.

In some embodiments, the apparatus can comprise an electromagnetic radiation (EM) emitter that has a controllably variable illumination power or exposure time, a depth tracking camera assembly configured to determine a distance to a user's hand using reflected EM emissions originating from the EM emitter, and an ambient light level detection mechanism. The EM emitter includes instructions to set the variable illumination power or exposure time with a positive correlation to an ambient light level detected by the ambient light level detection mechanism. Embodiments of an EM emitter include an illumination modules that generates infrared (IR) light.

In certain embodiments, the apparatus may be implemented in a near-eye display (NED) device, such as a head-mounted display (HMD) device, such as a Virtual Reality or Augmented Reality display system. In certain embodiments, the EM emitter may be implemented in conjunction with a camera to perform depth sensing for the HMD device.

In some embodiments, methods of varying the illumination power of the EM emitter include using detecting an ambient light level of a scene proximate to a NED, and varying an illumination power of an EM emitter on the NED device based on the detected ambient light level such that the illumination power has a positive correlation with the ambient light level.

In certain embodiments, the method may additionally utilize other contextual information such as depth of scene and a reflectivity value in order to determine the appropriate illumination power of the EM emitter. Varying the illumination power of the EM emitter may serve to conserve a limited power supply on a NED, such as a HMD. There may be more than one value for illumination power depending on the target of depth tracking. For example, an illumination power used for depth tracking of a user's hands would vary from the illumination power used for depth tracking of the space beyond the user's hands such as a spatial region/room.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 7 illustrates multiple concurrent illumination powers based on a contextual range.

DETAILED DESCRIPTION

Figure 1:
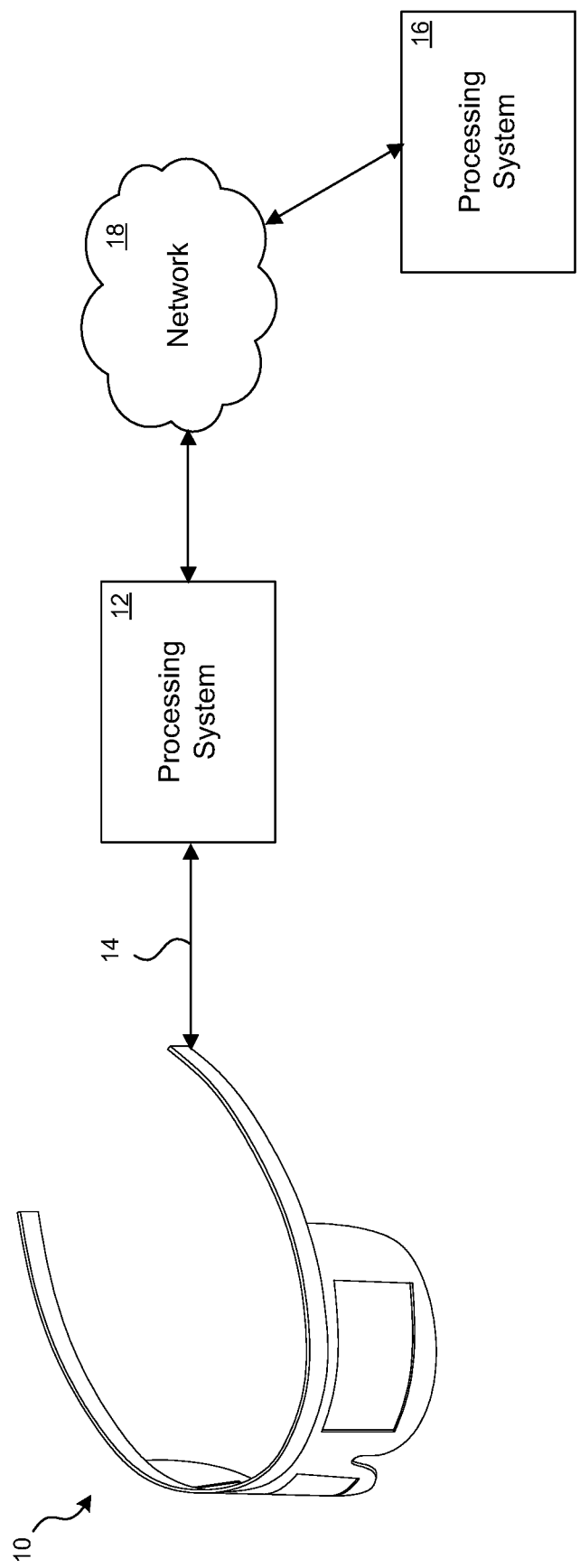
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The figures and related text describe certain embodiments of an illumination module in the context of NED systems. However, the disclosed embodiments are not limited to near-to-eye display systems and have a variety of possible applications, including any active illumination systems (i.e., actively using light sources) such as used in active light projection systems or any active camera modules. All such applications, improvements, or modifications are considered within the scope of the concepts disclosed here.

The following description generally assumes that a "user" of a display device is a human. Note, however, that a display device of the disclosed embodiments can potentially be used by a user that is not human, such as a machine or an animal. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled head-mounted display (HMD) devices and other near-to-eye display (NED) systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth sensing system that resolves distance between the HMD device worn by a user and physical surfaces of objects in the user's immediate vicinity (e.g., walls, furniture, people and other objects). The depth sensing system may include a ToF camera or a phase delay camera that is used to produce a 3D image of the scene. The captured image has pixel values corresponding to the distance between the HMD device and points of the scene.

The HMD device may have an imager device that generates holographic images based on the resolved distances, for example, so that holographic objects appear at specific locations relative to physical objects in the user's environment. The HMD device may also have one or more display devices to display the generated images overlaid on the view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIG. 1 schematically shows an example of an environment in which an HMD device can be used, where such HMD can implement the active illumination techniques introduced here. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
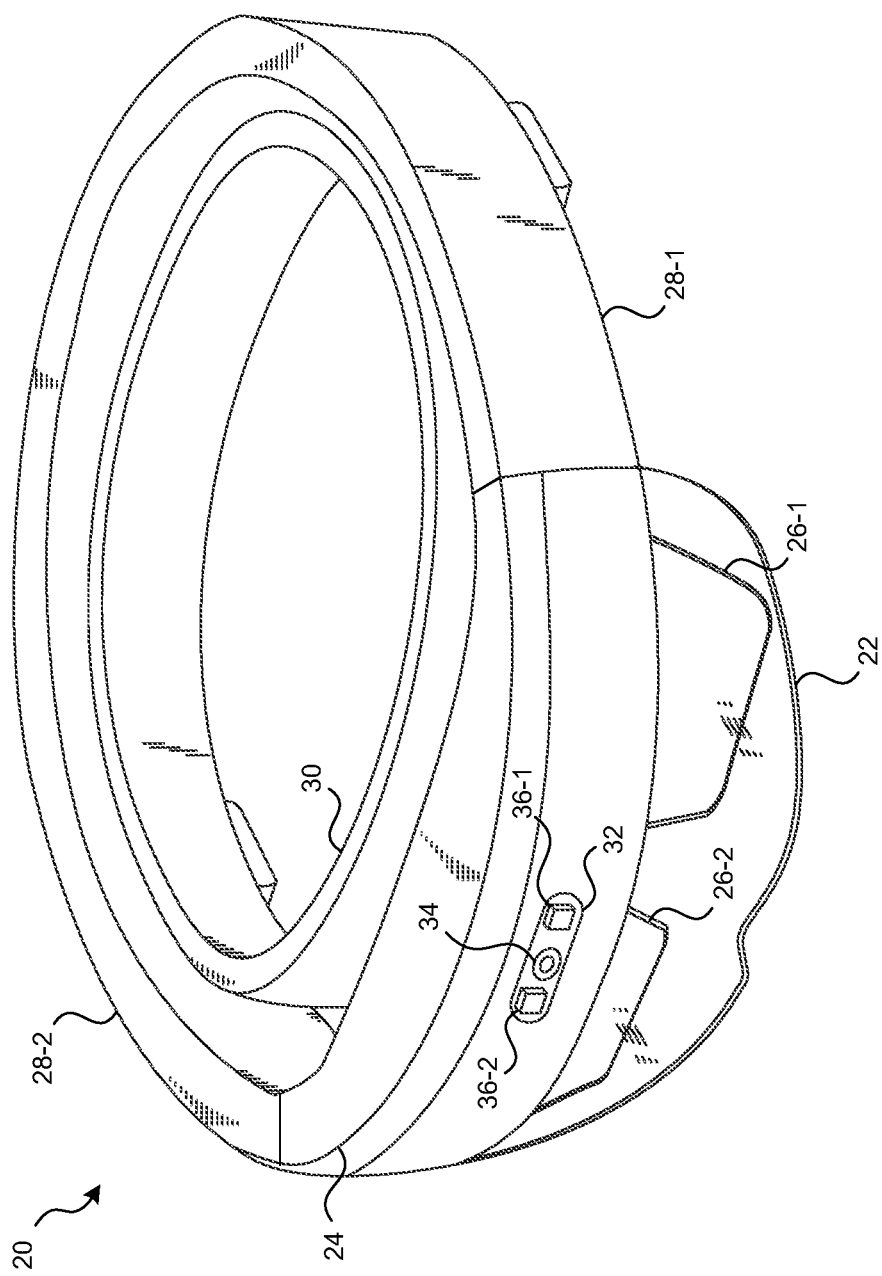
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and one or more associated illumination modules 36 (collectively referred to as illumination modules 36 and individually as illumination module 36-1 through 36-N) of a depth sensing system. The illumination modules 36 emit light to illuminate a scene. Some of the light reflects off surfaces of objects in the scene, and returns back to the depth camera 34. The depth camera 34 captures the reflected light that includes at least a portion of the light from the illumination modules 36.

The "light" emitted from the illumination modules 36 is electromagnetic radiation suitable for depth sensing and should not directly interfere with the user's view of the real world. As such, the light emitted from the illumination modules 36 is typically not part of the visible spectrum. Examples of the emitted light include infrared (IR) light to make the illumination unobtrusive. Sources of the light emitted by the illumination modules 36 may include LEDs such as super-luminescent LEDs, laser diodes, or any other semiconductor-based light source with sufficient power output.

The depth camera 34 may be or include any image sensor configured to capture light emitted by the illumination modules 36. The depth camera 34 may include a lens that gathers reflected light and images the environment onto the image sensor. An optical bandpass filter may be used to pass only the light with the same wavelength as the light emitted by the illumination modules 36. For example, in a ToF depth sensing system, each pixel of the depth camera 34 may measure the time light has taken to travel from the illumination modules 36 to surfaces of objects and back to the depth camera 34. Alternatively, in a phase delay depth sensing system, each pixel of the depth camera 34 may be used to measure a phase delay of reflected light as compared to the phase of emitted light from the illumination modules 36. Any of various approaches known to persons skilled in the art could be used for determining the timing, phases, phase delays, and corresponding depth calculations.

The HMD device 20 includes electronics circuitry (not shown in FIG. 2) to control and synchronize the operations of the depth camera 34 and the illumination modules 36, and to perform associated data processing functions. The circuitry may include, for example, one or more processors and one or more memories. As a result, the HMD device 20 can provide surface reconstruction to model the user's environment, or be used as a sensor to receive human interaction information, such as hand-tracking information. With such a configuration, images generated by the HMD device 20 can be properly overlaid on the user's 3D view of the real world to provide a virtual or augmented reality. Note that in other embodiments the aforementioned components may be located in different locations on the HMD device 20. Additionally, some embodiments may omit some of the aforementioned components and/or may include additional components not discussed above nor shown in FIG. 2.

Figure 3:
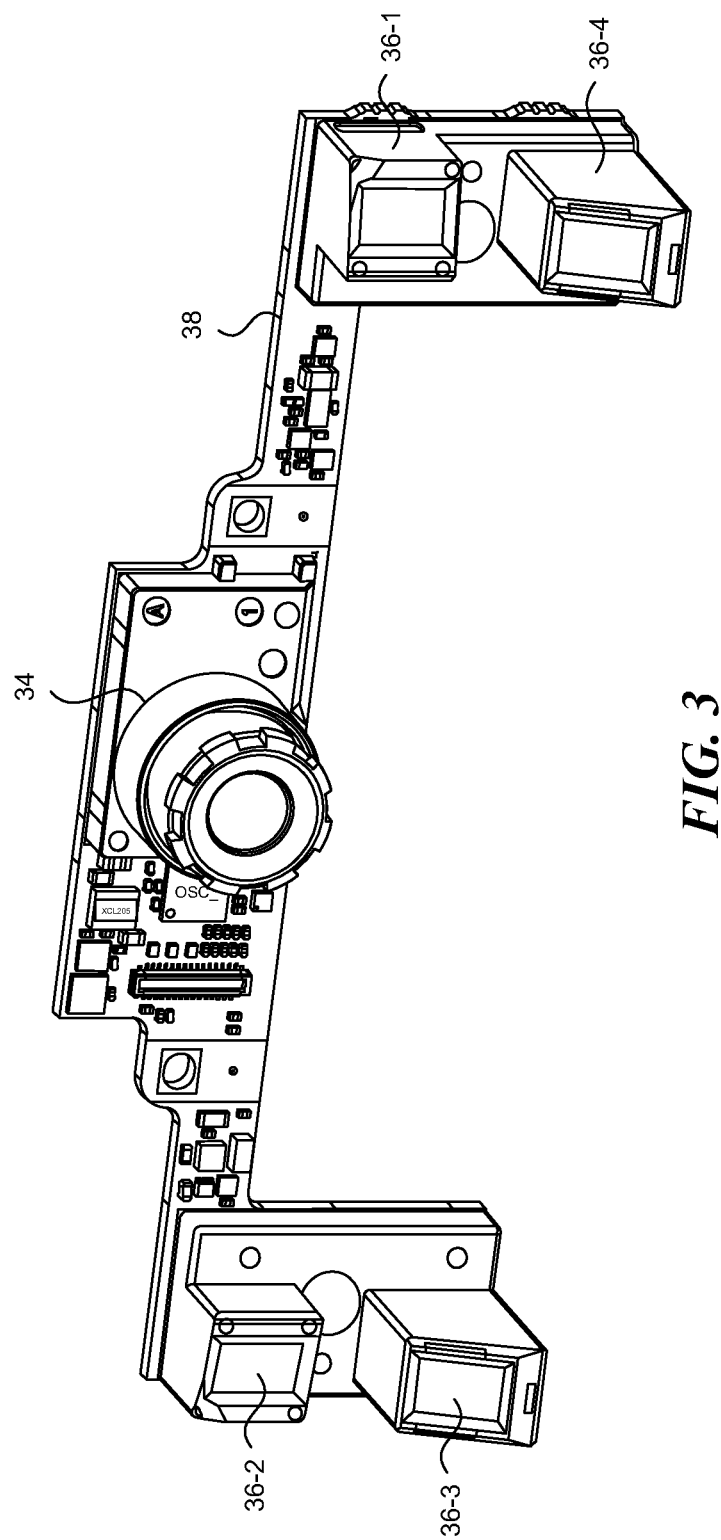
FIG. 3 shows a front view of a portion of a sensor assembly of an HMD device.

FIG. 3 shows a portion of the sensor assembly 32 of the HMD device 20, according to at least one embodiment. In particular, the sensor assembly 32 includes sensors and electronics mounted to a circuit board 38, which can be mounted to the chassis 24 as mentioned above. The sensors mounted to the circuit board 38 include the depth camera 34 and the illumination modules 36-1 through 36-4. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

In the illustrated embodiment, illumination modules 36-1 to 36-4 may be activated using detectably different light (e.g., as distinguished by frequency, wavelength, waveform, or amplitude). Detectably different light enables the depth sensing system to isolate portions of a scene and provide custom illumination powers, exposure times, or frame rates to isolated portions. This is because the depth camera is capable of differentiating between differing light emitted by illumination modules. Having different, concurrent illumination powers for the emitted lights enables variable power consumption for each portion of the scene.

Methods of varying the power of an EM emitter by an NED device may include the use of contextual information captured by sensors of the NED and are intended to reduce power consumption of depth tracking operations. Contextual information may include depth of a scene, reflectivity of a scene, and ambient light of a scene. Depth tracking involves emitting light to hit objects a scene, reflect back, and provide clear information to a sensor/camera. Accordingly, the illumination power setting of the EM emitter is designed to have suitable power to reach the farthest distances in a scene, reflect off the surfaces present, and still have enough power to be differentiated clearly over ambient light by the depth camera.

Figure 4:
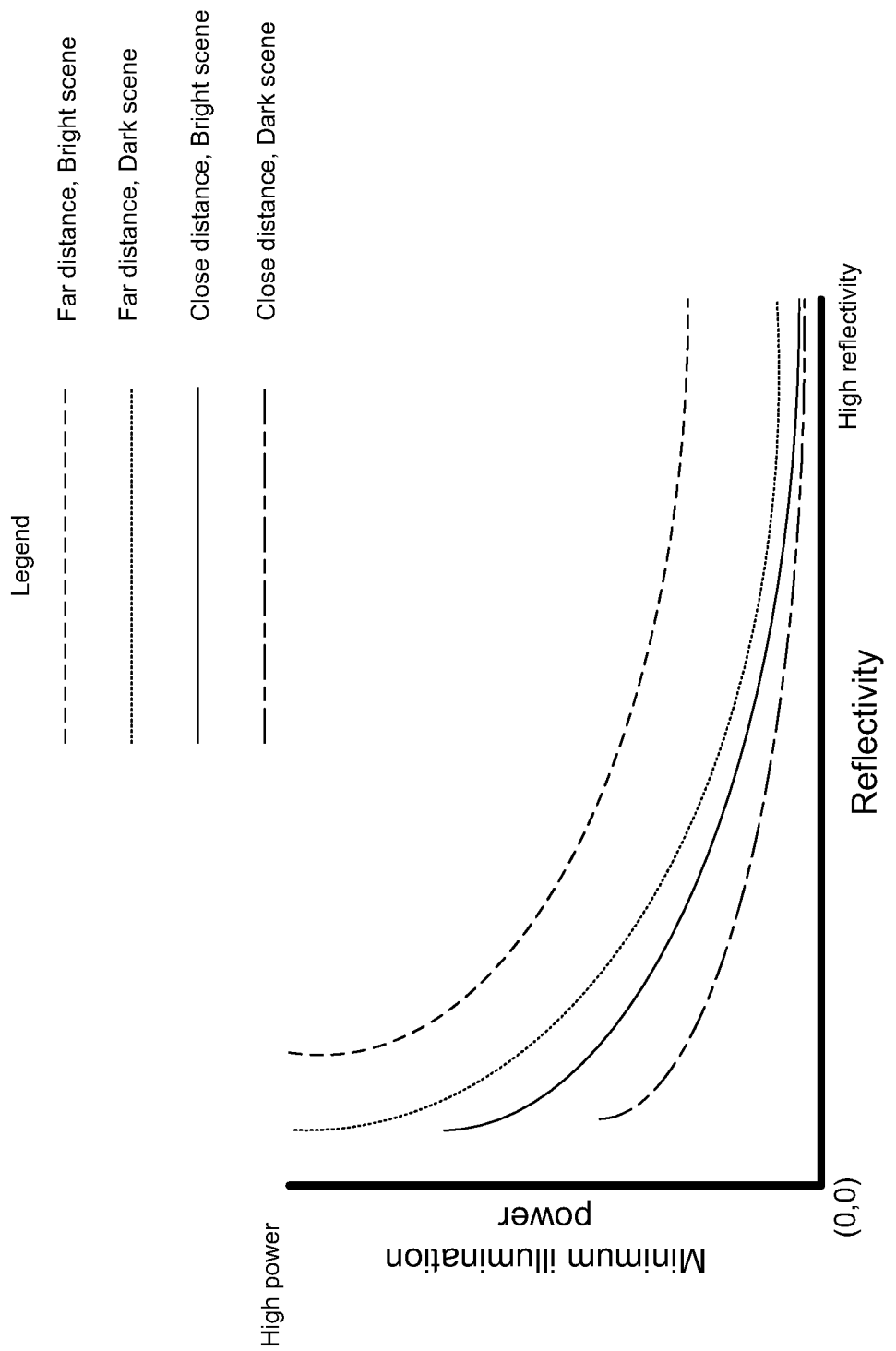
FIG. 4 is a graph displaying the relationship between contextual information and illumination power of an illumination module.

FIG. 4 is a graph illustrating examples of the relationship between contextual information and illumination power of an illumination module. More specifically, the graph serves to demonstrate the relationship between a minimum illumination power and three other contextual statistics: reflectivity, distance, and ambient light. The minimum illumination power refers to the power required to obtain a specified minimum level of depth camera performance within a threshold of accuracy that also keeps system power consumption to a relatively low level. Based on the quality of the depth camera, reflected light from the illumination module needs to be at a predetermined amplitude (power) in order to provide clear data to the depth camera.

The graph has axes for illumination power and reflectivity. Further, the graph shows two more characteristics: distance, and ambient light. Different values of distance and ambient light are shown as separate curves on the graph. Where an object is not reflective (e.g. 0% reflectivity) or if it has 0% effective reflectivity as it is a highly specular reflector, no amount of illumination will reflect to be captured by the depth camera. Even at low, non-zero reflectivity values, the amount of illumination power required is greater than what is feasible by a typical mobile device with strict power constraints. On the other end, at very high reflectivity values, the minimum illumination power approaches a minimum value for activating the EM emitter/illumination module.

As evident from the graph, reflectivity has a negative correlation with minimum illumination power. Where objects in the scene are more reflective, less power is necessary in the emitted light because more of the light's energy will be reflected back to the depth camera rather than absorbed by the object. The returning light from more reflective objects will have a greater amplitude, and is therefore easier to collect clear data from. The precise figures for minimum illumination power necessary as a function reflectivity are based on the resolution of the depth camera used in the NED.

In contrast to reflectivity, both distance and ambient light have less dramatic theoretical limits. As either distance or ambient light approach zero, the minimum illumination power does not also reach zero. Instead, the minimum illumination power approaches a minimum hardware-dependent value. This hardware-dependent value is a function of both a minimum detectable amplitude for the depth camera and a minimum power necessary to emit any radiation from the illumination module.

Unlike reflectivity values, both distance and ambient light exhibit a positive correlation with minimum illumination power. With respect to the ambient light, the greater the ambient light is, the greater is the minimum illumination power required to "overpower" the ambient. In order for the depth camera to differentiate between ambient light and the reflected light from the illumination module, the reflected light needs to be distinctive. One method to make the reflected light distinctive is for the reflected light to have a notable power difference from the ambient light. Where the light amplitude is greater than the ambient light, the depth camera may obtain clear data. The precise figures for minimum illumination power necessary as a function ambient light are based on the resolution of the depth camera used in the NED.

With respect to depth of scene/distance to objects, the relationship to illumination power is similar to that of ambient light. The greater the distance is, the greater is the minimum illumination power required to ensure that the light from the illumination module will reach objects, reflect back, and be detected by the depth camera.

To minimize power consumption of the depth calculations, according to certain embodiments introduced here, the illumination power is dynamically adjusted based on changes in the ambient environment as well as distance to the objects to provide minimum power to meet the hardware and accuracy requirements. In summary, this method entails using a previous frame, or previously recorded data, to inform the computation of illumination power used to generate a given frame. Once the NED determines the minimum illumination power, the illumination module activates at that power level. The illumination module emits electromagnetic radiation (e.g. IR light), the EM radiation reflects off surfaces in the scene, and the reflected light is captured by the depth camera. The method repeats for subsequent frames, dynamically setting the illumination power of each frame based on contextual information from one or more previous frames. Thus, the method reduces the overall power consumption of the depth camera assembly of the NED compared to those that use conventional active illumination techniques.

Varying the minimum illumination power of an NED is only one method of controlling power consumption. Similar results can be obtained by varying the exposure time of the camera/ToF sensor. Increasing the exposure time of the depth camera can be performed instead of increasing the illumination power. Thus, varying depth camera exposure time may be used as an alternative to, or in addition to, varying the illumination power as described herein.

Figure 5:
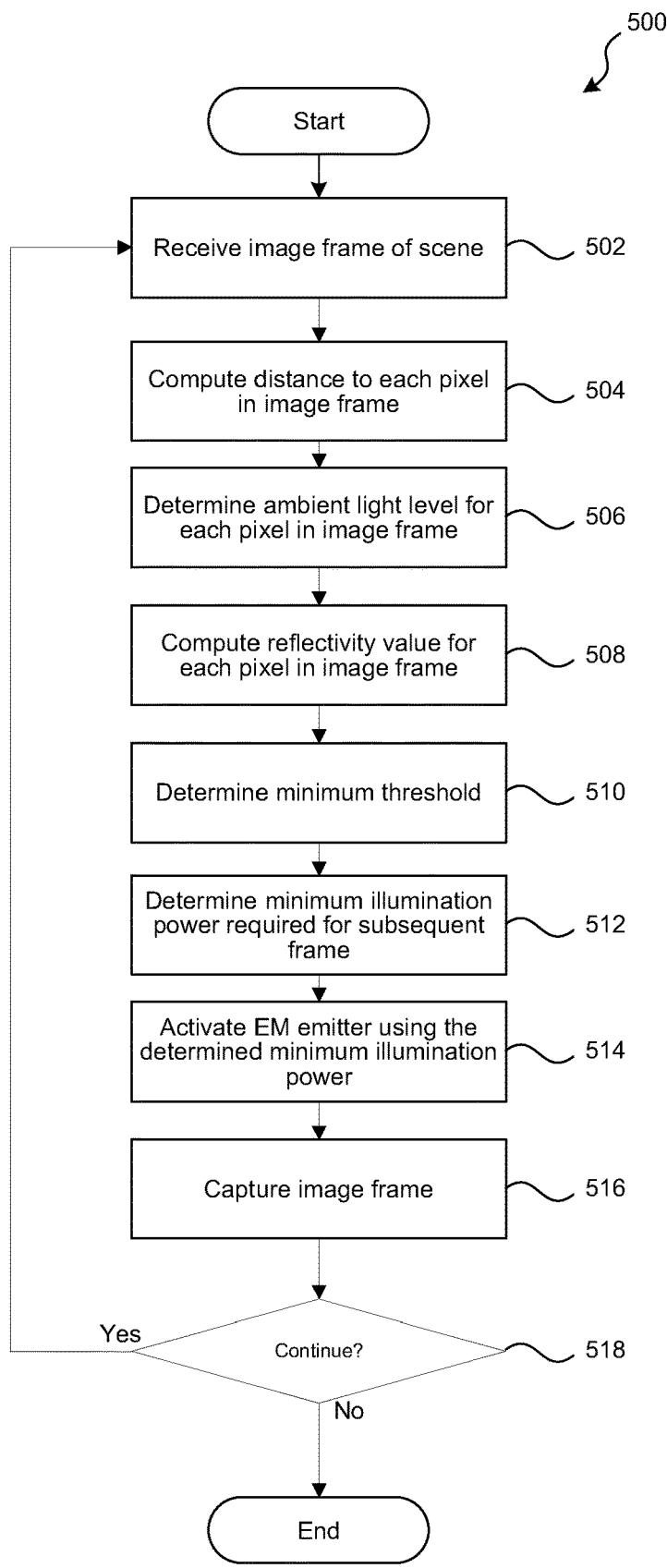
FIG. 5 is a flow diagram illustrating an example of a method of varying an illumination power.

FIG. 5 illustrates an example of a method of varying the illumination power of an active illumination module associated with a depth sensing system. The method begins at step 502, where the NED receives an image frame of a scene proximate to the NED. This image frame may have come from previous iterations of the method, or the first iteration. The frame is captured by the depth camera using light from the illumination module/EM emitter. In step 504, the depth camera assembly computes the distance of each pixel in the frame, from the NED to a reflective object, as described above. The calculations may be performed in any of various ways, such as ToF measurements or phase delay measurements.

In step 506, the NED determines the ambient light of the scene. The ambient light may be measured using an ambient light sensor in the sensor assembly or elsewhere in the NED. Another method of measuring ambient light is to calculate said ambient light based on data inherent in the image frame of the scene received in step 702. In some embodiments, both techniques are used to calculate ambient light levels. Where the previous image frame is used, this technique is performed on a pixel-by-pixel basis. Where an ambient light sensor is used, an average value for the whole frame is obtained. Use of both techniques enables error checking, operation without use of a previous frame, and averaging/blending across numerous data points.

In step 508, the NED computers the reflectivity value of each pixel in the scene. One method of calculating reflectivity values involves detecting overall brightness of the scene, then determining the "active brightness" (i.e., the difference between the overall brightness and the ambient light level in the spectrum of interest), and then normalizing the active brightness value for the quadratic decay in brightness based on the computed distance to the object (i.e., the corresponding computed depth value).

In step 510, the NED determines the minimum threshold value for contextual information computed in steps 504-508. The minimum threshold defines a percentage of an image frame that needs to be accurately defined by the depth camera in order for the depth sensing system to operate at specified level of certainty. This threshold may vary based on software application, specific use of the NED, location of the NED, or hardware constraints. Values of contextual information from steps 504-508 that exceed the threshold are outlier detected values that require the greatest illumination power to accurately define (lowest values for reflectivity, and highest values for ambient light and distance).

Example thresholds include 100%, 95%, 90%, 75%, etc. At 100%, the entire spatial scene needs to be accurately defined by distances from the NED to external surfaces by the depth camera. If the threshold is less than 100%, then the NED determines that the illumination power of the illumination module need not be high enough to accurately define the outlier portions of the image above the threshold.

In the case of ambient light as contextual information, the selected illumination power is based on the highest detected ambient light levels. This is because the selected illumination power is configured to "overpower" the ambient light. Thus, threshold enables the NED to ignore the outlier brightest portions of the scene. Therefore, the ambient light level used to determine the selected illumination power is the highest light level detected in the darkest portion of the scene, where the darkest portion comprises a specified percentage of the scene that has lowest detected light levels. In an example use case, where the NED is used outdoors, the minimum threshold may be configured to ignore direct sunlight, or consider the direct sunlight as an outlier brightness level. The sun is sufficiently bright and sufficiently distant that attempting to accurately calculate the distance of the sun with the depth camera of a NED is extremely difficult. Thus configuring the depth sensing system of the NED to ignore the sun (and therefore an establishment of a threshold) enables effective implementation of the power saving techniques taught herein.

In step 512, the NED determines the minimum illumination power needed for the frame received in step 502. This minimum illumination power if based on the contextual information and settings determined from steps 504-510. In step 514, The illumination module emits EM radiation at the determined minimum illumination power. The NED uses the emitted EM radiation in capturing the next frame. In step 516, the depth camera captures reflected light from the emitted light of step 514. The reflected light provides information necessary to define the scene.

In step 518, the method and depth tracking continues while the NED is in operation Where the operation continues, the frame captured in step 516 is recycled into step 502, and the method loops until the device is no longer in use.

Figure 6:
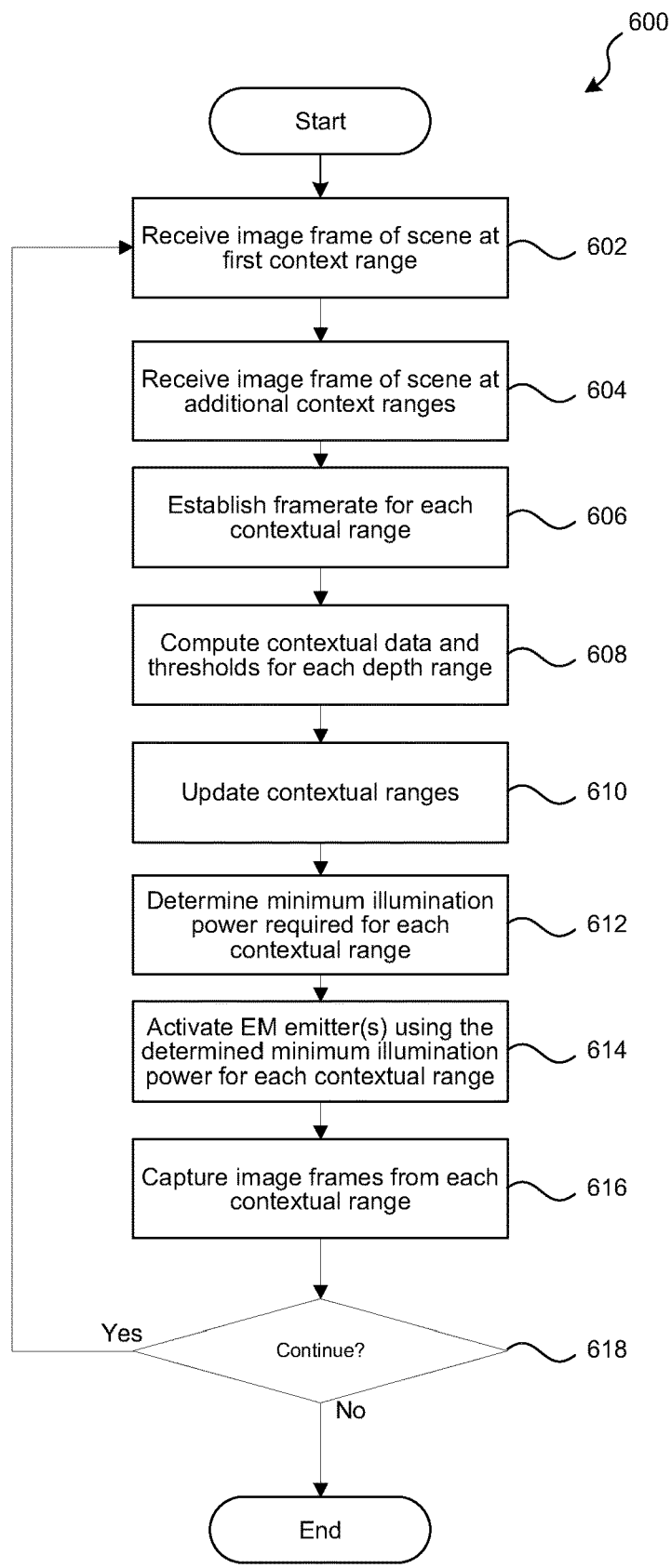
FIG. 6 is a flow diagram illustrating an example of a method of varying multiple illumination powers concurrently.

FIG. 6 illustrates an example of a method of varying multiple illumination powers concurrently. Concurrently managing multiple illumination powers enables additional granularity in power saving. The illumination module can manage multiple illumination powers based on set ranges of a particular contextual data. For example, depth may be used. There may be one illumination power for approximately zero to one meters (i.e. a rough approximation of arm length of a user), and there may be a second illumination power for distances greater than a meter. The contextual range defining concurrent illumination powers (e.g. distance) may also vary based on the tracked distance of a particular object (such as a user's hands).

In some embodiments the depth camera assembly uses a first illumination power for the tracking the user's hands, and a second illumination power for mapping the space beyond the user's hands. The location of the user's hands in a given frame is determined by the depth measured in previous frames.

Operating in this with concurrent, detectably different emitted lights (as distinguished, e.g., by frequency, wavelength, waveform, or amplitude) enables variable frame rates. This is because the depth camera is capable of differentiating between differing light emitted by illumination modules. Thus, where different light is emitted at different rates, the depth sensing system defines multiple frame rates for the applicable contextual ranges. Having different, concurrent illumination powers for the emitted lights enables varying power consumption for each.

The minimum illumination power for frames tracking a user's hands will generally be lower than the minimum illumination power for frames defining the space beyond the user's hands. This is because the distance from the depth sensor to the user's hands is smaller than the distance from the sensor to the space beyond the user's hands, and the reflectivity value of hands (especially for users having higher reflectivity skin tones in the IR wavelength range) is relatively high compared to other objects.

Because a user's hands can be very active, having a high frame rate for hand tracking is important for hand tracking accuracy (e.g., a frame rate of 30-60 frames-per-second is generally considered to be suitable). In at least some cases, for purposes of depth sensing, it is not necessary to have as high a frame rate for spatial mapping as for hand tracking—inanimate objects in a room tend not to move as much as a user's hands, if at all (e.g., a frame rate of one to five frames-per-second is generally considered to be suitable). Since the minimum illumination power required to accurately define a spatial area (e.g. a room) is often greater than the illumination power required to track a user's hands, and the frame rate requirement for defining the room is lower, it is beneficial from a power consumption perspective to use concurrent and detectably different light for hand tracking and spatial mapping. In this manner, the more "expensive" frames from a power consumption perspective may be captured less frequently.

Additionally, independent ranges may be used for other contextual information, such as ambient light or reflectivity values. In this manner, the frame rate for a given range of contextual information may different from the frame rate of a different range of contextual information.

Separating contextual ranges provides other benefits aside from independent frame rates and additional power management. One such benefit is increased depth measuring accuracy via use of differing wavelengths of light that are best suited for the contextual range in which each wavelength is used. For example, shorter wavelength may be useful for measuring shorter distances.

Referring again to FIG. 6, in step 602, the NED receives an image frame at a first range of contextual information (e.g., 0-1 meter of depth, or 0-3000 lux ambient light level, or greater than 25% reflectivity value). As described above, the contextual information may be any of depth, reflectivity, or ambient light levels. In step 604, the NED receives an image frame from additional contextual ranges. Step 604 begins with obtaining a second frame; however, the NED receives additional frames for each contextual range. The NED may include previously defined (e.g., stored) contextual ranges, or it may determine them dynamically.

In step 606, the NED assigns a frame rate for each contextual range. In some embodiments, the same depth camera captures the different frame rates for each of the contextual ranges. A single or multiple EM emitters may be used to achieve the different desired illumination power levels.

In step 608, the NED determines the contextual information of the frames obtained in steps 602 and 604. The NED may receive the frames of steps 602 and 604 at different times (due to varied frame rates), and thus step 608 may occur multiple times for a given cycle or iteration of the method, or may occur for one contextual range more frequently than another.

In step 610, in embodiments where the contextual ranges are dynamically adjusted, the NED updates the contextual ranges. For example, an initial contextual range may be a region within one meter of the NED in order to capture the user's hands. If the NED never detects the user's hands further than three-fourths of a meter, the contextual range can be reduced to three-fourths of a meter. In embodiments where contextual ranges are not dynamically adjusted, step 610 is skipped.

In step 612, the NED determines the minimum illumination power for each contextual range. This step is performed similarly to the method illustrated in FIG. 5. In step 614, the illumination module emits light at each selected illumination power associated with each contextual range. As stated previously, this step may occur over a long period of time, or multiple times depending on the frame rate of each contextual range. In step 616, the depth camera captures reflected light corresponding to the emitted light of step 614. The reflected light provides information necessary to define the scene for each contextual range, thereby generating a frame for each contextual range at each associated frame rate.

In step 618, the method and depth tracking continues while the NED is in operation. Where the operation continues, the frames captured in step 616 are recycled into step 602-604, and the method loops until the device is no longer in use. The method may loop independently for each contextual range based on associated frame rates.

FIG. 7 illustrates multiple concurrent illumination powers based on a contextual range with reference to an HMD device 40. FIG. 7 provides illustration to the method of FIG. 6. A user wearing a HMD device 40 has a field of illumination 42 as generated by the illumination module. The field of illumination 42 may include objects or subject matter that provide context to generate ranges to vary illumination power and/or illumination frequency. FIG. 7 particularly illustrates a range or depth based context for generating variation in illumination power or illumination frequency.

The field of illumination 42 includes a first depth range 44 and a second depth range 46. The first depth range 44 is configured to include the space immediately proximate to the user, including the user's hands 48. The second depth range 46 includes the space beyond the user's hands 48. The second depth range is intended to capture the remainder of a room or spatial area. The distinction between the depth ranges may be a predetermined set value (e.g. an average user arm length), a determined learned value (e.g. a value assigned during an HMD calibration operation and based upon a given user's arm length), or a measured or computed variable (e.g. the most recently calculated depth of the user's hands).

The second depth range 46 may include a wide variety of objects. Such objects include inanimate objects 50 and animate objects 52 (e.g. people or animals). Further, some objects will be light sources 54. Light sources 54 will often not emit enough infra-red light to raise the ambient brightness of the scene. However, at particular points (e.g. the surface of active light bulbs) the ambient infra-red brightness may be relatively high.

It is often more expensive, from an illumination power perspective, to compute the depth of objects in the second depth range 46 than objects in the first depth range 44. This is because of their distance from the HMD device 40, and their potential for creating "bright spots." Despite this, frames from the second depth range 46 may be captured less frequently because in many circumstances, moving, animate objects 48, 52 will comprise a lesser percentage of the whole content of the depth range. The use of depth contextual range and other ranges enables greater granularity in power consumption control.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

1. A method comprising: detecting an ambient light level of a scene proximate to a near-eye display (NED); and varying an illumination power of an electromagnetic radiation (EM) emitter on the NED device based on the detected ambient light level such that the illumination power has a positive correlation with the ambient light level.

2. The method of example 1, wherein the electromagnetic radiation is infrared light.

3. The method of each previous example, further comprising: detecting a reflectivity value of the scene; wherein said varying the illumination power of the EM emitter on the NED is further based on the reflectivity value such that the illumination power has a negative correlation with the reflectivity value.

4. The method of each previous example, wherein the ambient light level of the scene is detected by any of: an ambient light sensor; or a non-illuminated frame of the scene.

5. The method of each previous example, wherein the scene comprises a hand of a user.

6. The method of each previous example, further comprising: detecting a distance to an object in the scene relative to the NED; wherein said varying the illumination power of the EM emitter on the NED is further based on the reflectivity, the illumination power has a positive correlation with the distance.

7. The method of example 6, said detecting the distance to the object further comprising any of: calculating a time of flight for a EM emission to travel from the EM emitter of the NED and reflect back from the object; or calculating a phase delay of a received reflected EM emission, from a emission phase of the EM emission.

8. The method of each previous example, wherein the scene comprises a spatial region about the NED beyond hands of a user.

9. The method of each previous example, wherein the ambient light level is a highest light level detected.

10. The method of each previous example, wherein the ambient light level is a highest light level detected in a darkest portion of the scene, the darkest portion comprises a predetermined percentage of the scene that has lowest detected light levels.

11. A near-eye display (NED) comprising: an electromagnetic radiation (EM) emitter that has a controllably variable illumination power; a depth tracking camera assembly configured to determine a distance to a user's hand using reflected EM emissions originating from the EM emitter; and an ambient light level detection mechanism; wherein the EM emitter is configured to set the variable illumination power with a positive correlation to an ambient light level detected by the ambient light level detection mechanism.

12. The device of example 11, further comprising: a reflectivity calculator configured to determine a reflectivity value of a scene proximate to the head mounted device; and wherein the EM emitter includes instructions to set the variable illumination power with a negative correlation to the reflectivity value detected by the reflectance sensor.

13. The device of example 11, wherein the EM emitter includes instructions to set the variable illumination power with a positive correlation to the distance calculated by the depth camera assembly.

14. The device of examples 11-13, wherein the electromagnetic radiation is infrared light.

15. The device of examples 11-14, wherein the depth tracking camera assembly calculates the distance to the user's hand based upon any of: a time of flight of receiving the reflected EM emissions; or a phase delay of the reflected EM emissions as compared to a phase of an original EM emission.

16. The device of examples 11-15, further comprising: a digital memory configured to store scene data including past values, the past values including: reflectivity value; ambient light level; and depth of scene; and wherein the EM emitter includes instructions to set the variable illumination power based on the past values.

17. A method of varying the illumination power of electromagnetic radiation (EM) emitters on a head mounted device to reduce power consumption comprising: detecting a first ambient light level and a second ambient light level of a scene proximate to a head mounted device, where the first ambient light level pertains to the spatial area within reach of a hand of a user, and the second ambient light level pertains to spatial area beyond the hand of the user, the first and second ambient light levels detected via any of: an ambient light sensor; or a non-illuminated frame of the scene; varying a first illumination power and a second illumination power of the EM emitter based on the first ambient light level and the second ambient light level, where the first ambient light level positively correlates to the first illumination power and the second ambient light level positively correlates to the second illumination power.

18. The method of example 17, further comprising: detecting a first reflectivity value and a second reflectivity value of a scene proximate to the head mounted device where the first reflectivity value pertains the hand of a user, and the second reflectivity value pertains to spatial area beyond the hand of the user; varying the first illumination power and the second illumination power of the EM emitter based on the first reflectivity value and the second reflectivity value, where the first reflectivity value negatively correlates to the first illumination power and the second reflectivity value negatively correlates to the second illumination power.

19. The example of example 17-18, further comprising: detecting a first distance and a second distance of a scene proximate to the head mounted device where the first distance to a hand of a user, and the second distance value pertains to spatial area beyond the hand of the user; varying the first illumination power and the second illumination power of the EM emitter based on the first distance and the second distance, where the first distance positively correlates to the first illumination power and the second distance positively correlates to the second illumination power.

20. The example of example 17-19, wherein the electromagnetic radiation is infrared light.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method, comprising:
receiving an image frame of a scene proximate to a display device;
determining contextual information of the scene, the contextual information including a reflectivity value corresponding to one or more pixels of the scene;
emitting electromagnetic radiation (EM) radiation by an EM emitter coupled with the display device based on the contextual information; and
receiving a next image frame of the scene in response to the EM radiation.

2. The method of claim 1, wherein emitting the EM radiation comprises emitting infrared light.

3. The method of claim 1, wherein determining the contextual information includes determining one or more of a depth of the scene, an ambient light level of the scene, or a reflectivity of the scene.

4. The method of claim 1, wherein determining the contextual information of the scene comprises:
detecting a distance to an object in the scene relative to the display device;
determining one or more settings of the EM emitter to emit the EM radiation based on the distance to the object; and
emitting the EM radiation further based on the one or more settings.

5. The method of claim 4, wherein detecting the distance to the object comprises:
calculating a time of flight for an EM emission to travel from the EM emitter and reflect back from the object, wherein the distance to the object is based on the time of flight; or
calculating a phase delay of a received reflected EM emission, from a emission phase of the EM emission, wherein the distance to the object is based on the phase delay.

6. The method of claim 1, wherein determining the contextual information of the scene comprises:
detecting an ambient light level of the scene;
determining one or more settings of the EM emitter to emit the EM radiation based on the ambient light level; and
emitting the EM radiation further based on the one or more settings.

7. The method of claim 6, wherein detecting the ambient light level of the scene comprises:
measuring, by an ambient light sensor coupled with the display device, the ambient light level.

8. The method of claim 1, wherein determining the contextual information of the scene comprises:
determining one or more settings of the EM emitter to emit the EM radiation based on the reflectivity value; and
emitting the EM radiation further based on the one or more settings.

9. The method of claim 1, further comprising:
determining a minimum threshold value for the contextual information;
determining one or more settings of the EM emitter to emit the EM radiation based on the minimum threshold value; and
emitting the EM radiation further based on the one or more settings.

10. The method of claim 1, further comprising:
determining a minimum illumination power for the image frame;

determining one or more settings of the EM emitter to emit the EM radiation based on the minimum illumination power; and emitting the EM radiation further based on the one or more settings.

11. A display device, comprising:
a camera configured to receive a plurality of image frames;
an electromagnetic radiation (EM) emitter configured to emit EM radiation; and
a processor coupled with the camera and the EM emitter and configured to:
receive an image frame of a scene proximate to the display device from the camera;
determine contextual information of the scene, the contextual information including a minimum illumination power for the image frame;
control the EM emitter to emit the EM radiation based on the contextual information; and
receive a next image frame of the scene from the camera in response to the EM radiation.

12. The display device of claim 11, wherein the EM radiation is infrared light.

13. The display device of claim 11, wherein the contextual information includes one or more of a depth of the scene, an ambient light level of the scene, or a reflectivity of the scene.

14. The display device of claim 11, wherein the processor is further configured to:
detect a distance to an object in the scene relative to the display device;
determine one or more settings of the EM emitter based on the distance to the object; and
control the EM emitter to emit the EM radiation further based on the one or more settings.

15. The display device of claim 11, wherein the processor is further configured to:
detect an ambient light level of the scene;
determine one or more settings of the EM emitter based on the ambient light level; and
control the EM emitter to emit the EM radiation further based on the one or more settings.

16. The display device of claim 11, wherein the processor is further configured to:
detect a reflectivity value corresponding to one or more pixels of the scene;
determine one or more settings of the EM emitter based on the reflectivity value; and
control the EM emitter to emit the EM radiation further based on the one or more settings.

17. The display device of claim 11, wherein the processor is further configured to:
determine a minimum threshold value for the contextual information;
determine one or more settings of the EM emitter based on the minimum threshold value; and
control the EM emitter to emit the EM radiation further based on the one or more settings.

18. The display device of claim 11, wherein the processor is further configured to:
determine one or more settings of the EM emitter based on the minimum illumination power; and
control the EM emitter to emit the EM radiation further based on the one or more settings.

19. A method, comprising:
receiving an image frame of a scene proximate to a display device;
determining first contextual information and second contextual information of the scene, where the first contextual information corresponds to a first spatial area from the display device, and the second contextual information corresponds to a second spatial area beyond the first spatial area;
emitting electromagnetic radiation (EM) radiation by one or more EM emitters coupled with the display device based on the first contextual information and the second contextual information; and
receiving next image frames of the scene in response to the EM radiation.

20. The method of claim 19, further comprising:
determining frame rates corresponding to each of the first contextual information and the second contextual information; and
emitting the EM radiation according to the frame rates.

* * * * *